July 10, 1951  V. V. BENISCHEK  2,560,208
APPARATUS FOR MOLDING CONCRETE BLOCKS
Filed March 10, 1948  9 Sheets-Sheet 1

Victor V. Benischek
INVENTOR.

BY Clarence A. O'Brien
and Harvey B. Jacobson
Attorneys

July 10, 1951 V. V. BENISCHEK 2,560,208
APPARATUS FOR MOLDING CONCRETE BLOCKS
Filed March 10, 1948 9 Sheets-Sheet 3

Victor V. Benischek
INVENTOR.

July 10, 1951 V. V. BENISCHEK 2,560,208
APPARATUS FOR MOLDING CONCRETE BLOCKS
Filed March 10, 1948 9 Sheets-Sheet 4

Victor V. Benischek
INVENTOR.

Victor V. Benischek
INVENTOR.

July 10, 1951  V. V. BENISCHEK  2,560,208
APPARATUS FOR MOLDING CONCRETE BLOCKS
Filed March 10, 1948  9 Sheets-Sheet 6

Victor V. Benischek
INVENTOR.

BY *Clarence A. O'Brien*
*and Harvey B. Jackson*
Attorneys

Patented July 10, 1951

2,560,208

UNITED STATES PATENT OFFICE 2,560,208

APPARATUS FOR MOLDING CONCRETE BLOCKS

Victor V. Benischek, Albuquerque, N. Mex.

Application March 10, 1948, Serial No. 14,024

9 Claims. (Cl. 25—41)

This invention relates to apparatus for molding blocks from a plastic cementitious aggregate and has for its primary object to receive the cementitious aggregate in a plastic state, shape and compact the aggregate into the desired form, and to deliver the finished product in the form of a block or blocks ready for curing.

Another object is to effect economies in the time and labor involved in the production of cement blocks of the type commonly employed in the construction of buildings.

A still further object is to deliver the aggregate into a mold, compact the aggregate in the mold during the delivery thereof, advance the mold containing the compacted aggregate to an ejecting station, ejecting the product through the bottom of the mold and transferring the finished product to a conveyor for delivery to the curing kilns, all in a continuous operation requiring the services of but a single attendant to see that a proper supply of the plastic aggregate is at all times available for the operation of the machine.

A still further and more specific object of the invention is to produce a smooth top surface on the blocks as they are moved from the position between the filling hopper and the point of ejection.

Among its features this invention embodies a table mounted to move horizontally from a pallet feeding station to an aggregate supply station and thence to a block ejecting station, spaced molds mounted in said table to move vertically with relation thereto, a pallet feeding and positioning mechanism at the pallet feeding station, an aggregate directing hopper engaging the top of the top of the table at the aggregate supply station for feeding aggregate into a mold positioned therebeneath to which a pallet has previously been attached, and means beneath the hopper to jolt the mold and compact the aggregate therein.

Other features include means operating from above the table at the block ejecting station to eject molded blocks downwardly through a mold positioned at the ejecting station and to disengage the pallet at the bottom of the mold, product transfer means beneath the mold at the product ejecting station upon which the pallet, together with the molded products, is deposited as the products are ejected from the mold, and a conveyor upon which the pallet and products are deposited by the transfer means.

Still other features include means operable beneath the table at the aggregate feeding station to jolt the mold while the aggregate is being fed thereinto.

Still further features involve drive mechanism automatically to position a pallet on the underside of a mold, to move the pallet and mold box jolting mechanism upwardly into pallet engaging position, to eject the molded product from the mold and deposit it on the conveyor, all in sequence and in timed relation whereby the entire operation becomes automatic.

Referring to the drawings in detail, a column 10 comprising a tubular body is fixed, as at 12, to a suitable base or bed 14. Surrounding the column 10 in spaced relation to the bed 14 is a horizontally extending annular supporting stand 16 which is provided in its upper face with a suitable race for bearing balls 18. The tubular column 10 is provided adjacent its lower end with a vertically extending slot 20, the purpose of which will more fully hereinafter appear.

Mounted for rotation about the column 10 on the bearing balls 18 is the base flange 22 of an upwardly extending rotatable sleeve 24 which surrounds the column 10 and projects upwardly to a point near the top of said column. Fixed to the sleeve 24 near its upper end is a turntable 26 which is provided at radially spaced points with rectangular openings 28 (Fig. 1) for the reception of the molds to be more fully hereinafter described. The bottom face of the turntable 26 has secured thereto suitable stops 30 (Fig. 7) which extend across the corners of the openings 28 to arrest the descent of the molds with relation to the table 26. Projecting upwardly from the flange 22 at radially spaced points are latch pins 32 which are adapted to be engaged by the drive and stop mechanism to be more fully hereinafter described. These latch pins 32 are accurately located with relation to the openings 28 in the table 26 so as to form part of means to arrest movement of the table at predetermined positions about the axis of the column 10 during placing of the pallets, the filling of the molds, and the ejection of the molded products.

Extending radially from the column 10 adjacent its upper end are horizontally projecting arms 34 which lie in spaced relation to one another and carry between them vertical guide sleeves 36 for the ejecting mechanism to be more fully hereinafter described. Extending upwardly and outwardly from the column 10 adjacent its upper end and diametrically opposite the arms 34 is a bracket arm 38 and pivotally supported at the upper end of the bracket arm 38 is a lever 40 which forms the support and actuating arm of the ejector previously referred to. Mounted for vertical sliding movement through the column 10 is a plunger rod 42, the upper end of which is pivotally connected, as at 44, to the lever 40, and surrounding the plunger rod between the lever 40 and the upper end of the column 10 is a compression spring 46, the upper end of which bears against a stop washer 48 carried by the plunger rod 42, while the lower end of the spring bears on the upper end of the column 10. The lever 40 will thus be held elevated as suggested in Figure 3. Extending laterally from the plunger rod 42 adjacent its lower end and projecting through the slot 20 in the column 10 is an actuating pin 50 forming part of mechanism by means of which the plunger rod 42 is pulled downwardly against the effort of the spring 46 during the ejection of a finished block from a mold.

Mold box

Figure 1:
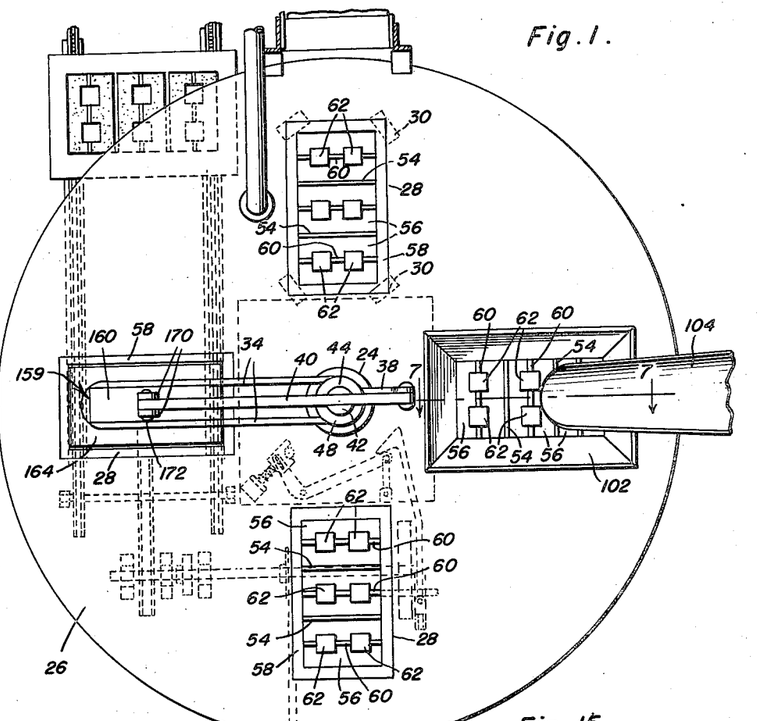
Figure 1 is a top plan view of one embodiment of block forming apparatus embodying the features of this invention.
Figure 7:
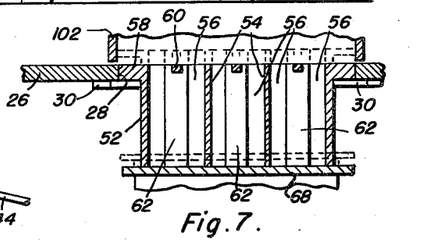
Figure 7 is a fragmentary sectional view taken substantially along the line 7—7 of Figure 1.

The mold boxes employed in conjunction with the machine are best illustrated in Figures 1 and 7 and each comprises a rectangular tubular body 52 which is open at both ends and in its preferred form is provided with transversely extending partition walls 54 arranged in spaced parallel relation to form three molding chambers 56 in which three separate blocks are molded simultaneously. An outstanding flange 58 surrounds the upper end of each mold box and is of a thickness substantially equal to the thickness of the table 26. The outer perimeter of the flange 58 is of a size readily to fit within an opening 28 in the table 26 so that when the mold is in position in the table, the bottom of the flange 58 will rest upon the stops 30 previously described. Extending longitudinally of the upper ends of chambers 56 are supporting bars 60, and suspended from said supporting bars and extending to the bottoms of said chambers 56 are spaced parallel cores 62. The bottom of each mold box is wholly open except for the bottom edges of the partition walls 54 and the bottom ends of the cores 62, so that the molded blocks may be ejected through the bottoms of the molds. Owing to the fact that the flanges 58 coact with stops 30 to suspend the mold boxes 52 in the openings 28 of the table 26, it is obvious that the molds may be inserted into the table and extracted therefrom from the top thereof, and also the mold boxes will be free to move upwardly as suggested by the dotted lines in Figure 7 during the introduction of the aggregate into the molds, and the jolting of the molds to compact the aggregate. Secured to opposite ends of the mold box 52 are channel-shaped brackets 64 to which depending pallet clips 66 are secured.

In order to close the under sides of the mold boxes 52 and prevent the escape of aggregate therefrom during the filling and jolting operation, I provide a plurality of pallets 68 which are fed, one at a time, to a position beneath the mold boxes 52 for engagement by the clips 66 which serve to support the pallets in position relative to the mold boxes during their movements from the pallet loading station, through the mold filling station, and to the product discharge station.

Pallet feed mechanism

In order to position one pallet at a time beneath a mold box at the pallet loading station, I employ a pallet magazine and feeding device designated generally by the numeral 70. This device comprises a pair of spaced parallel standards 72 fixed to the bed 14 in such a position as to project upwardly adjacent the periphery of the table 26. The upper ends of these standards are joined by an inverted channel member 74 which forms a stop against which the upper edges of the pallets 68 rest while they are in the magazine. The lower edges of the pallets 68 rest on downwardly inclined spaced parallel bars 76, the lower ends of which are disposed slightly above the plane of the lower ends of the mold boxes 52 and are provided with upturned hooks 78 which cooperate with the channel 74 in holding a group of pallets in position for delivery, one at a time, to the mold boxes. It is to be noted that the endmost pallet 68 nearest the turntable 26 rests at its upper end against the flange of the channel 74 which is carried by the standards 72, while the rest of the pallets in the magazine are supported against the depending flange of the channel 74 remote from the standards 72. In this way, the pallet 68 positioned nearest to the turntable 26 may be lifted upwardly over the upper edges of the hooks 78 to deliver it from the magazine while leaving the rest of the pallets remaining in the magazine. Pivotally supported, as at 80, to the standards 72 are spaced parallel angle bars 82, corresponding flanges of which are turned inwardly to form supports for a pallet. These angle bars 82 are held in spaced parallel relation by cross bars 84 and 86 (Fig. 4) with the cross bar 84 being positioned near the ends of the bars 82 furthest away from the pivot 80, and projecting longitudinally from the bar 84 and away from the pivot 80 are spaced stops 88 by which a pallet moving along the bars 82 is arrested. Carried at the ends of the side bars 82 remote from the stops 88 are heads 90 (Fig. 2), the upper portions of which are provided with inclined faces 92 forming wedges which are adapted to enter between the lower edge of the pallet 68 which engages the hooks 78, and the lower edge of the next adjacent pallet so that when the arms 82 are moved downwardly, as suggested in the dotted line position in Figure 2, the pallet 68 will be lifted upwardly and guided toward the turntable 26, so that its lower edge will be deposited on the bars 82 adjacent the heads 90, and the pallet will thus be caused to slide by gravity down the bars 82 until it is arrested against the stops 88 previously referred to. Obviously, when the pallet rests against the stops 88, and the bars 82 are moved about the pivot 80 to extract the head 90 from the pallet magazine, the pallet resting on the bars will be elevated to a position to be engaged by the pallet clips 66 on the bottom end of a mold 52 which has been moved into pallet receiving position. Pivotally coupled to the cross bar 86 is one end of a link 94, the opposite end of which is pivotally coupled to one end of a lever 96 which is pivotally supported intermediate its ends, as at 98, to a bracket 100 which depends from the stand 16, as will be readily understood upon reference to Figure 2. The end of the lever 96 remote from that which is coupled to the link 94 is connected to the drive mechanism of the machine, as will be more fully hereinafter explained.

*Mold filling and aggregate compacting equipment*

Positioned about the axis of the column 10 at substantially ninety degrees from the pallet loading station just described is a mold filling and compacting station, at which is located a suitable hopper 102. This hopper is of hollow frustro inverted pyramidal form with its lower end so disposed and arranged as to receive the perimeter of the flange 58 of a mold supported in an opening 28 in the table 26. The hopper is so fixed that its lower edge lies adjacent the upper surface of the table 26, so that as a filled mold is moved by the table away from its position beneath the hopper, the lower edge of the hopper will serve to scrape any excess aggregate off of the top of the mold and the contents thereof. A suitable aggregate conveying spout 104 which leads from any suitable source of aggregate supply (not shown) is arranged above the hopper 102 in such a manner that aggregate flowing down the spout will be discharged into the hopper 102 from whence it is discharged into a mold 52 as soon as the latter has moved into position beneath the hopper.

Positioned at the mold filling station directly beneath the hopper is a mold jolting unit designated generally 106. This jolting unit comprises a platform 108 carrying upwardly projecting guide pins 110. Mounted for vertical sliding movement on the guide pins 110 is a movable bed 112, and supported on the platform 108 are bearing brackets 114 in which a rock shaft 116 is mounted for vertical and oscillatory movement. Fixed to the shaft 116 are longitudinally spaced supporting cams 118 which rest upon the platform 108 and engage the under side of the movable bed 112 so that when the shaft 116 is rocked, the movable bed 112 will be raised or lowered with relation to the platform 108. A torsion spring 120 is attached at one end to the platform 108, and its opposite end is fitted into a slot 122 formed in one end of the shaft 116, and this spring serves as a booster to aid in rocking the shaft 116. A lever 124 is fixed to the shaft 116 adjacent the end remote from the slot 122, and pivotally coupled to the lever 124 remote from the shaft 116 by means of a pivot pin 126 is a sector plate 128 which is provided with an arcuate slot 130 through which the shaft 116 projects. Fixed to the shaft 116 at 132 is a cocking arm or lever 134, and extending through the lever 134 adjacent the end remote from its pivotal connection 132 is a pin 136 to which one end of a retractile coil spring 138 is coupled. The opposite end of the spring 138 is coupled to an eye 140 carried by the sector plate 128 along a radius substantially midway between opposite ends of the arcuate slot 130. It will thus be seen that as the cocking lever 134 is rocked about the axis of the shaft 116, the spring 138 will be extended periodically to snap the cams 118 into vertical or horizontal position. An actuating link 142 is pivotally coupled at one end to the arm 134 by means of the pin 136, and the opposite end of the link 142 is connected to the oscillating drive arm of the machine as later described. A link 144 is coupled at one end to a pin 146 which projects laterally from the arm 124 intermediate the ends thereof, and the end of the link 144 remote from the pin 146 is coupled to the lever of the actuating and timing cam as will be more fully hereinafter described.

Figure 2:
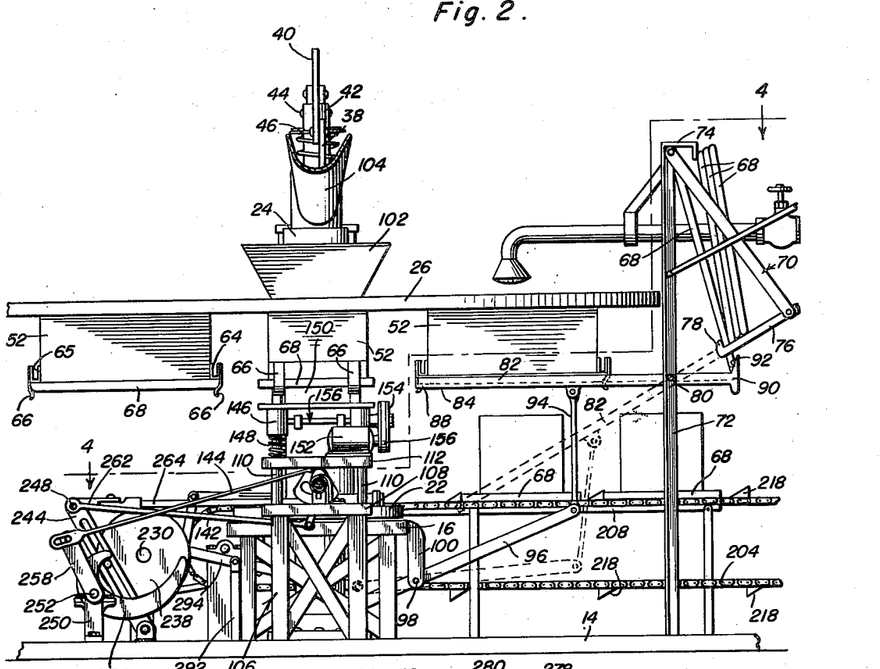
Figure 2 is a side view of the apparatus illustrated in Figure 1.
Figure 3:
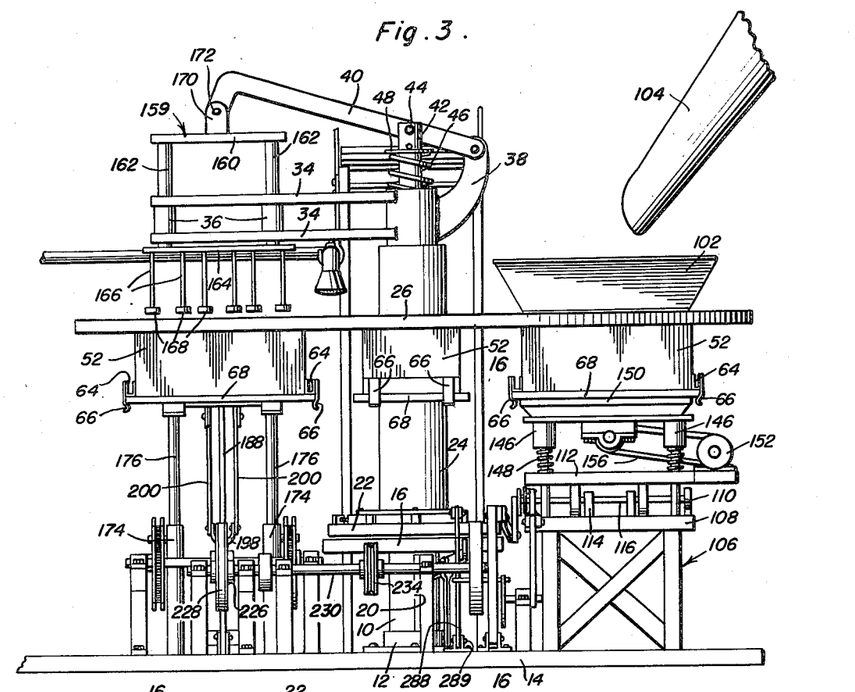
Figure 3 is an end view looking at the apparatus from a position substantially at right angles to the position illustrated in Figure 2.
Figure 8:
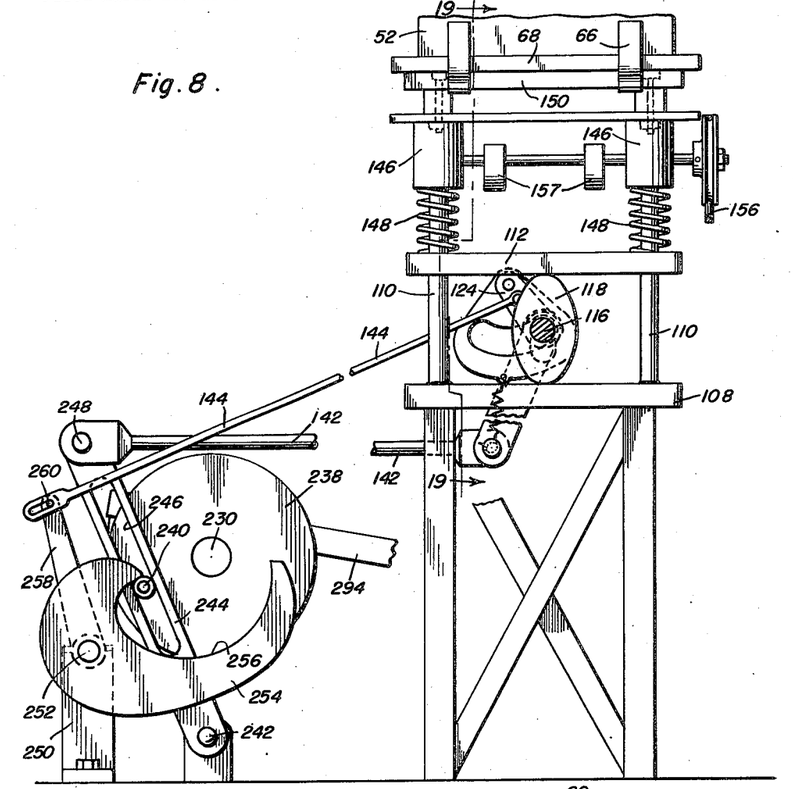
Figure 8 is an enlarged side view of the mold jolting equipment, illustrating its connection to the drive mechanism for the machine.
Figure 9:
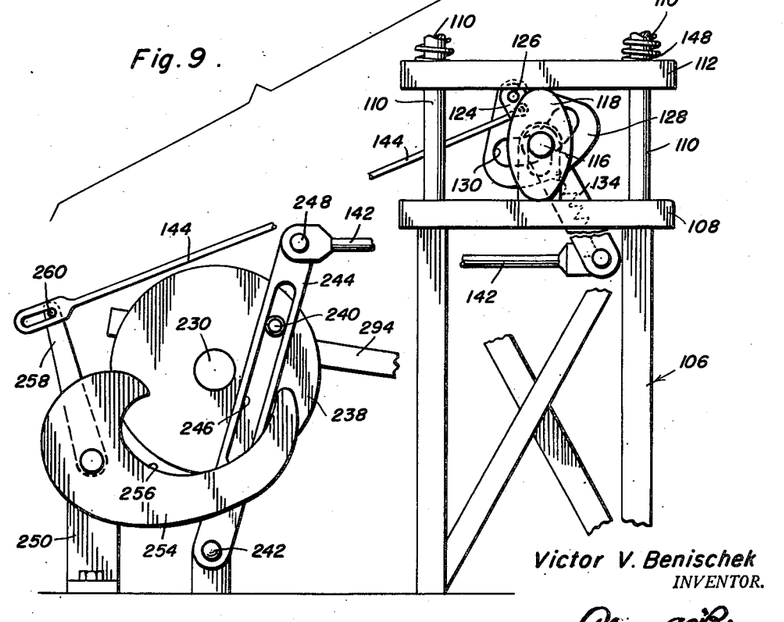
Figure 9 is a fragmentary view similar to Figure 8 illustrating the parts in another position.

Mounted for vertical sliding movement on the upper ends of the pins 110 are guide sockets 146 (Figs. 3 and 8), the lower ends of which rest on the upper ends of compression coil springs 148 which surround the pins 110 and rest on the upper face of the movable bed 112. These sockets support at their upper ends a table 150 which, as illustrated in Figures 2 and 3, is adapted to engage the bottom face of a pallet 68 closing the under side of a mold box 52 which is positioned beneath the hopper 102. Mounted on the movable bed plate 112 is a suitable electric motor 152 which is coupled to the drive pulley 154 of a conventional vibrating or jolting mechanism 156 through the medium of an endless belt 156. This vibrating or jolting mechanism 156 is adapted to cause the table to move vertically on the pins 110, thus to vibrate the mold box 52 while the aggregate is being deposited therein through the hopper 102. It will thus be seen that as the aggregate enters the mold box 52, it will be compacted therein to form a block or blocks of the desired density.

*Block ejector and transfer mechanism*

Mounted for vertical sliding movement in the sleeves 36 carried by the arms 34 diametrically opposite the hopper 102 is a block ejector designated generally 159 which comprises a cross head 160 carrying depending guide rods 162 which slide through the sleeves 36 and are connected at their lower ends by a head plate 164. Depending from the head plate 164 are plunger rods 166 carrying at their lower ends heads 168 of a size and shape to fit the chambers 56 in the mold boxes 52 between the partitions 54, cross bars 60 and cores 62 so that when the head plate 164 is moved downwardly, the heads 168 will engage the shaped blocks to eject them through the bottom of the mold box which is positioned at the product ejecting station. Projecting upwardly from the cross head 160 are spaced parallel ears 170 which are coupled through a pin and slot connection 172 to the end of the lever 40 remote from that which is pivoted to the bracket 38. It will thus be seen that when the plunger rod 42 is moved downwardly against the effort of the spring 46, the ejector 159 will move downwardly and cause the molded products to be forced through the bottom of the mold box 52.

Figures 10, 16:
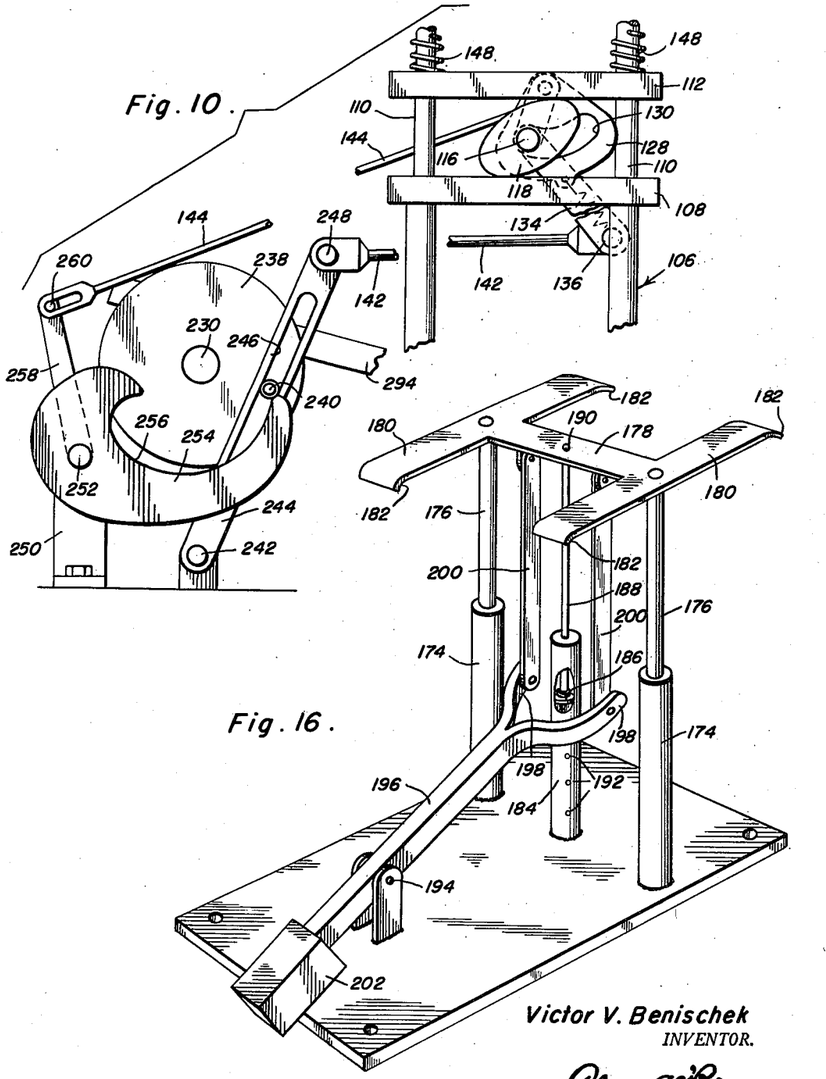
Figure 10 is a fragmentary view similar to Figures 8 and 9 illustrating the parts in still a different position.
Figure 16 is a perspective view of the product transfer apparatus.
Figure 11:
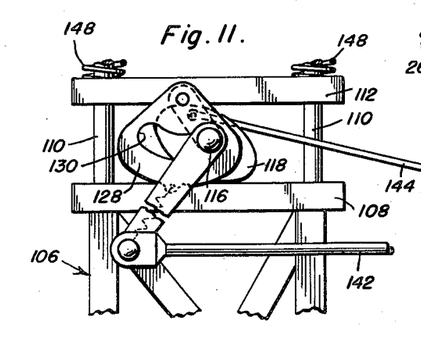
Figure 11 is an enlarged fragmentary sectional view taken substantially along the line 11—11 of Figure 5 and illustrating the parts of the jolting mechanism in the position shown in Figure 10.
Figure 12:
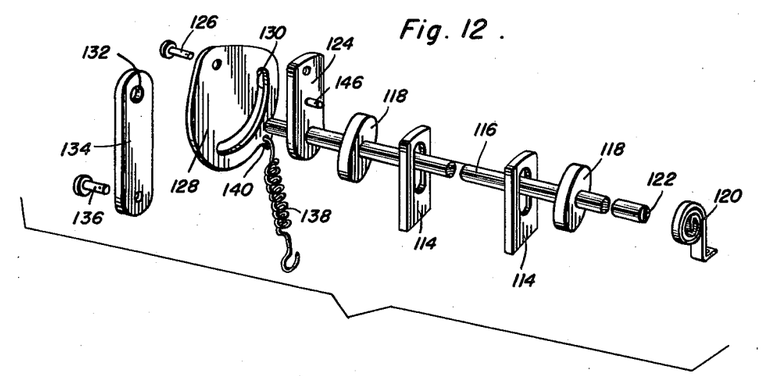
Figure 12 is an exploded view in perspective illustrating the parts employed in the jolter elevator.
Figure 14:
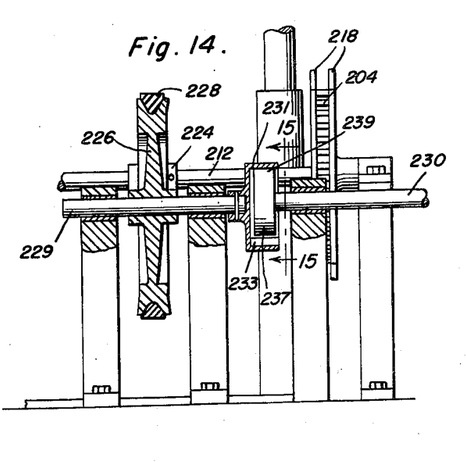
Figure 14 is a fragmentary enlarged sectional view through a portion of the conveyor drive shaft taken substantially along the line 14—14 of Figure 4.

In order to hold the pallet 68 in proper position against the bottoms of the molded product during the ejection of the products from the mold, I provide a transfer mechanism best illustrated in Figure 16. This transfer mechanism comprises a pair of spaced vertically extending guide sockets 174 into the upper ends of which are telescopically fitted plungers 176, the upper ends of which are joined by a cross bar 178 provided at opposite ends with oppositely extending arms 180. This cross bar 178 and the arms 180 form a platform or table which, when elevated, engages the under side of a pallet carried by a mold box 52 which is at rest at the ejection station of the machine. Opposite ends of the arms 180 are curved downwardly, as at 182, so that as a mold box approaches the ejecting station, it will encounter these guides and cause the platform or table to be slightly depressed. Extending vertically between the guide sleeves 174 is a cylinder 184 having a piston 186 which is connected to the lower end of a piston rod 188 which works through the upper end of the cylinder and is coupled, as at 190, to the cross bar 78. The cylinder 184 is provided at spaced points with bleeder openings 192 through which air compressed within the cylinder by reason of the downward movement of the piston 86 may escape, and at the same time such compressed air will serve as a cushion to retard the downward movement of the bar 178 and the arms 180. Pivotally supported as at 194 near the cylinder 184 is a lever 196 having a bifurcated end which forms spaced arms 198 to which are pivotally coupled adjacent their lower ends links 200, the upper ends of which are pivotally connected to the cross bar 178. A counterweight 202 is carried by the lever 196 at the end remote from the bifurcated end and normally urges the cross bar 178 and the arms 180 upwardly. It will thus be seen that with the transfer mechanism located directly beneath the block ejector 159, as the products from the mold are forced downwardly by the plunger heads 168, their downward movement will be resisted by the cross bar 178 and the arms 180 of the transfer mechanism so that the pallet upon which the products are supported will be held against the bottoms thereof.

Figures 4, 13:
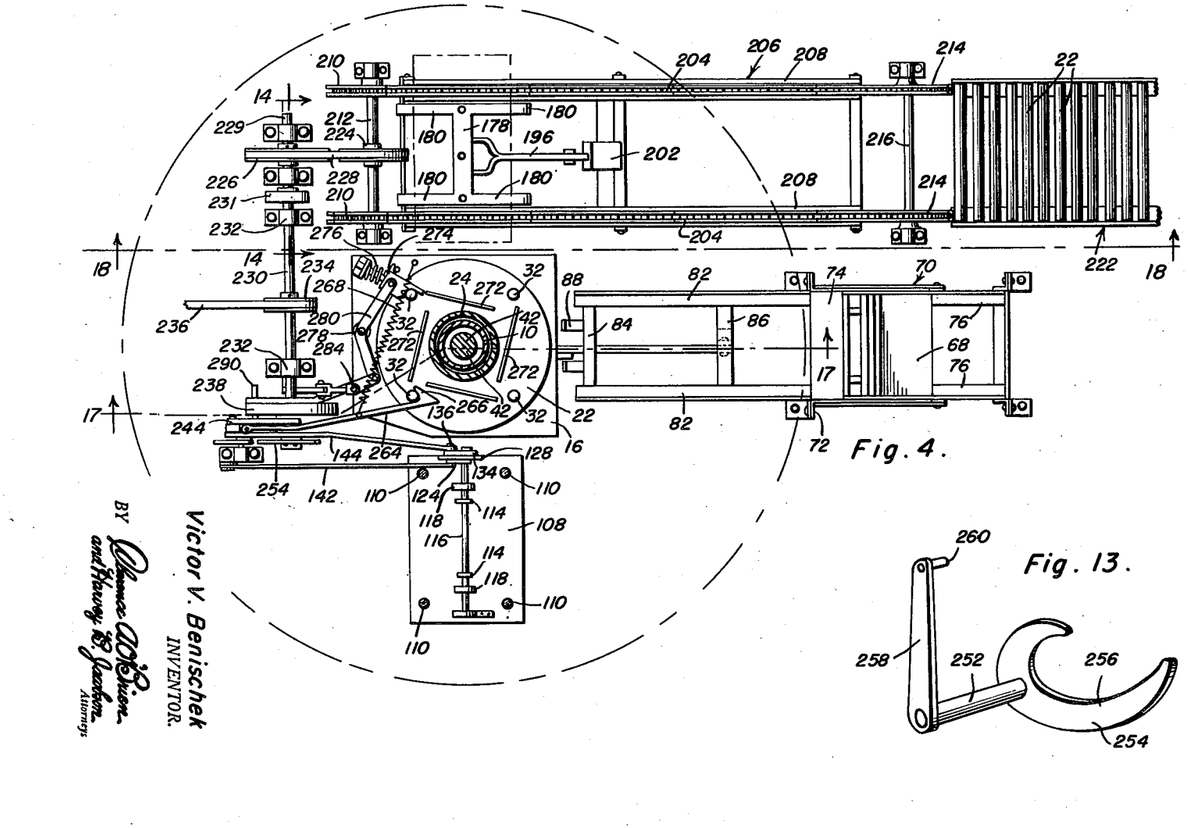
Figure 4 is a horizontal sectional view taken substantially along the broken line 4—4 of Figure 2.
Figure 13 is a fragmentary perspective view of the control cam for the jolter elevator.

As illustrated in Figure 4, the product transfer apparatus is adapted to work between a pair of conveyor chains 204 of a product conveyor designated generally 206. This product conveyor 206 comprises two separate sections one of which constitutes a driven conveyor composed of the chains 204 which ride along spaced parallel guides 208 which support the upper runs of the chains. These chains are trained over drive sprockets 210 which are keyed or otherwise fixed to a drive shaft 212, so that the chains will move in unison. At the opposite end of the driven conveyor, the chains 204 are trained over idler sprockets 214 mounted on a horizontal supporting shaft 216 which lies parallel with the shaft 212. The chains 204 are provided with outwardly extending lugs 218 (Fig. 2) which are spaced from one another a distance sufficient to accommodate a pallet 68 which has been transferred from the mold box 52, together with the molded product by the transfer mechanism onto the chains 204. The pallets moving under the influence of the chains 204 toward the end of the driven section of the conveyor 206 remote from the transfer mechanism are received on the rollers 220 of a conventional roller conveyor, designated generally 222 which forms the second unit of the conveyor 206. Carried on the drive shaft 212 intermediate the ends thereof is a drive pulley 224 having connection with a pulley 226 through the medium of an endless belt 228, so that when the pulley 226 is rotated, the conveyor chains 204 will move in unison to advance the pallets resting thereon together with the products toward the roller conveyor 222. The pulley 226 is keyed or otherwise fixed to a drive shaft 229 which is intermittently driven by the main drive shaft of the machine in a manner to be more fully hereinafter described.

Figure 15:
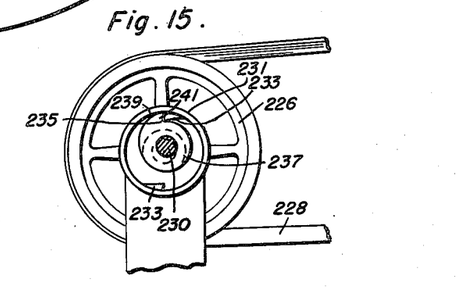
Figure 15 is a fragmentary enlarged sectional view taken substantially along the line 15—15 of Figure 14.

The shaft 229 is mounted to rotate about a horizontal axis in spaced parallel relation to the end of the conveyor 206 thereof. Fixed to the end of the shaft 229 nearest the center of the machine is a cylinder 231 having an open end which faces away from the shaft 229. Extending longitudinally of the cylinder 231 diametrically opposite one another are inwardly extending lugs 233 (Fig. 15) having radial driving faces 235 which lie in a plane which intersects the longitudinal axis of the shaft 229.

Machine drive

Journaled in suitable bearings 232 is a main drive shaft 230, one end of which lies adjacent but out of axial alignment with the shaft 229. This shaft 230 is provided intermediate its ends with a drive pulley 234 which has driving connection with a suitable prime mover (not shown) through the medium of an endless drive belt 236, and fixed to the end of the drive shaft 230 adjacent the shaft 229 is a drive disk 237 having projecting from its periphery a driving dog 239, the driving face 241 of which lies in a plane radial to the axis of the shaft 230 and is adapted to engage the face 235 on a lug 233 to impart rotary motion to the shaft 229. Fixed to the end of the drive shaft 230 opposite the drive disk 237 is a disk 238 which carries on one face an outwardly extending eccentrically located pin 240. Pivotally supported beneath the axis of the drive shaft 230 adjacent the disk 238, as at 242, is a lever arm 244 which is provided with an elongated longitudinal slot 246 in which the pin 240 is received. It will thus be seen that as the disk 238 rotates, the lever arm 244 will swing about the axis of its pivot 242 through a vertical arc. Pivotally coupled, as at 248, to the lever arm 244 adjacent the end remote from the pivot 242 is the end of the link 142 opposite that which is connected to the actuating arm 134 of the mold box elevating and jolting device previously described.

Figure 5:
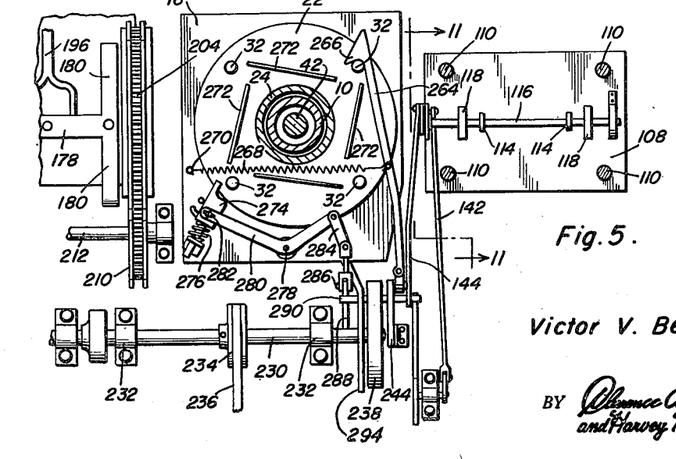
Figure 5 is a fragmentary view similar to Figure 4 illustrating the parts in another position.
Figure 6:
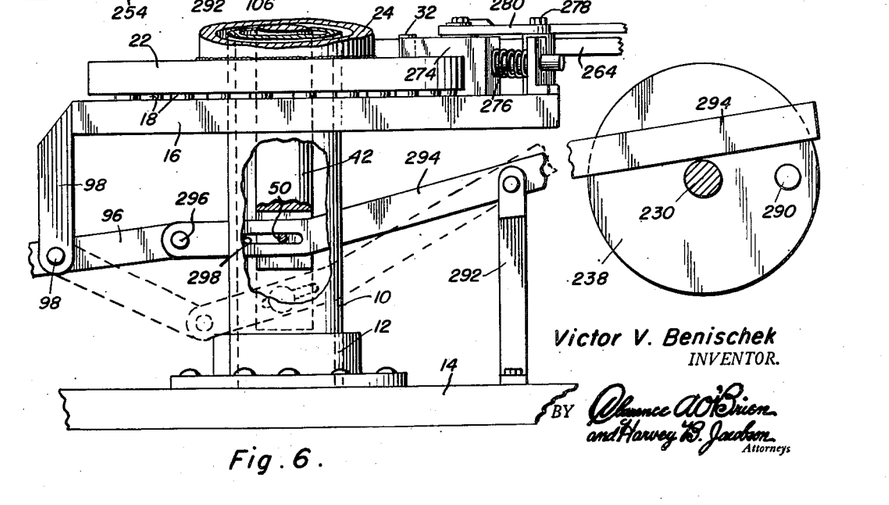
Figure 6 is an enlarged fragmentary side view of a portion of the column upon which the table is supported, certain portions of the column being broken away more clearly to illustrate certain details of construction.

Mounted in a suitable bracket 250 adjacent the disk 238 is a shaft 252 carrying at one end a trip cam 254 having an arcuate cam track 256 in which the pin 240 engages to cause the cam 254 to rock about the axis of the shaft 252 as the disk 238 is rotated. A lever arm 258 is fixed to the opposite end of the shaft 252 and this arm is coupled through the medium of the pin and slot connection 260 to the end of the link 144 previously mentioned. It will thus be seen that as the lever arm 244 is moved through the vertical arc, the lever arm 124 will cause the shaft 116 to rock in timed relation to the movements of the main drive shaft and the arm 134 will be snapped under the influence of the spring 138 so that when a mold box is at the filling station, the table 150 will be raised with great rapidity to engage the under side of the pallet 68. Pivotally coupled at 248 to the lever 244 adjacent the link 142 is a bracket 262 (Fig. 2) to which is pivoted one end of a pawl or latch arm 264. This latch arm is provided adjacent the end remote from its pivotal connection to the lever 244 with a latch dog 266 which, as illustrated in Figures 4 and 5, is adapted to engage the pins 32 in succession so that as the lever 244 is moved away from the machine, pull will be exerted on a pin 32 to cause the flange 22 to rotate the sleeve 24 and index the table 26 around the axis of the column 19 a distance of exactly ninety degrees. A retractile coil spring 268 is coupled at one end to the latch arm 264, and the opposite end of said spring is anchored, as at 270, to the stand 16. Suitable guard plates 272 project upwardly from the flange 22 between the pins 32 to serve as guides during the time that the latch arm 264 is advancing to engage a pin 32. In order to hold the table against accidental rotation, I provide a keeper 274 which is mounted for sliding movement on the plate 16 and is adapted to be projected under the influence of a compression coil spring 276 into engagement with a pin 32, as illustrated in Figure 4. In order periodically to release the keeper 274 during the rotation of the table under the influence of the latch arm 264, I pivotally support, as at 278 on the stand 16, a bellcrank arm 280 which is coupled at 282 through a pin and slot connection to the keeper 274. The opposite end of the bellcrank 280 has connected thereto one end of a link 284, the opposite end of which is coupled, as at 286, to a rock arm 288 which is adapted to rock about a pivot 289 when engaged by a pin 290 which projects laterally from the face of the disk 238 opposite the pin 240.

Figure 17:
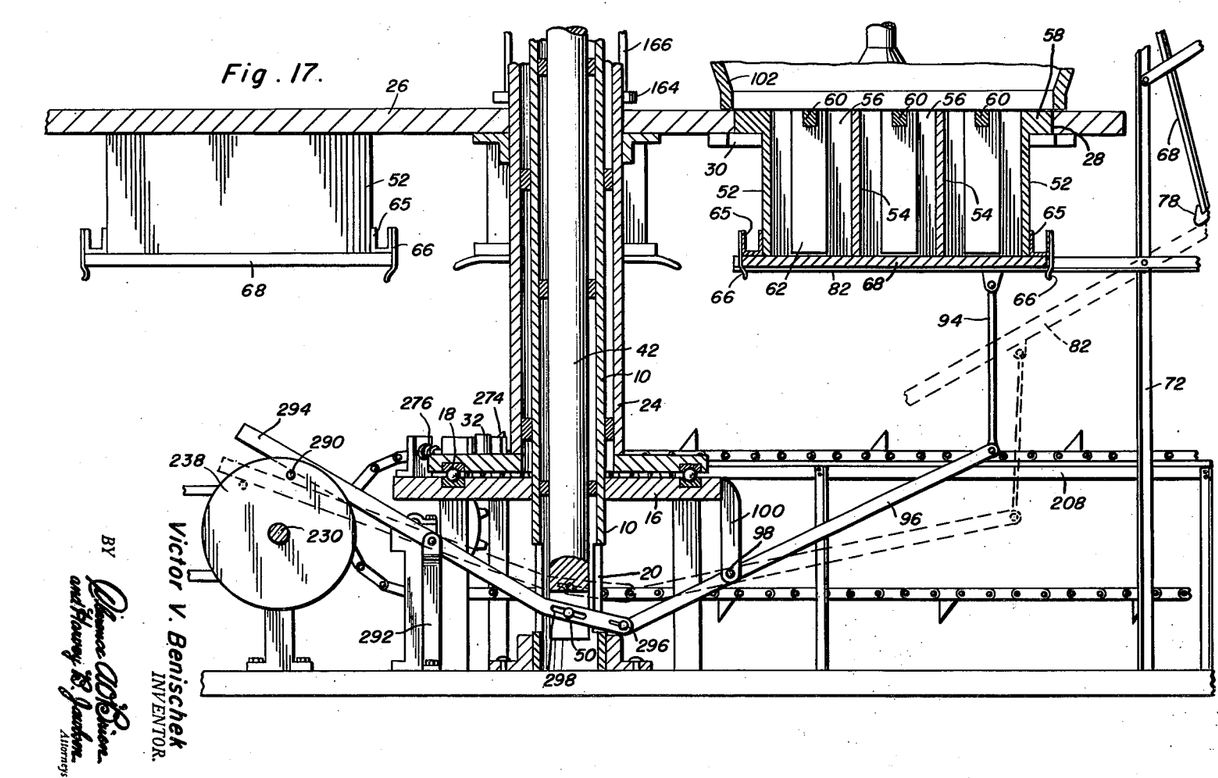
Figure 17 is a longitudinal sectional view taken substantially on the line 17—17 of Figure 4.
Figures 18, 19:
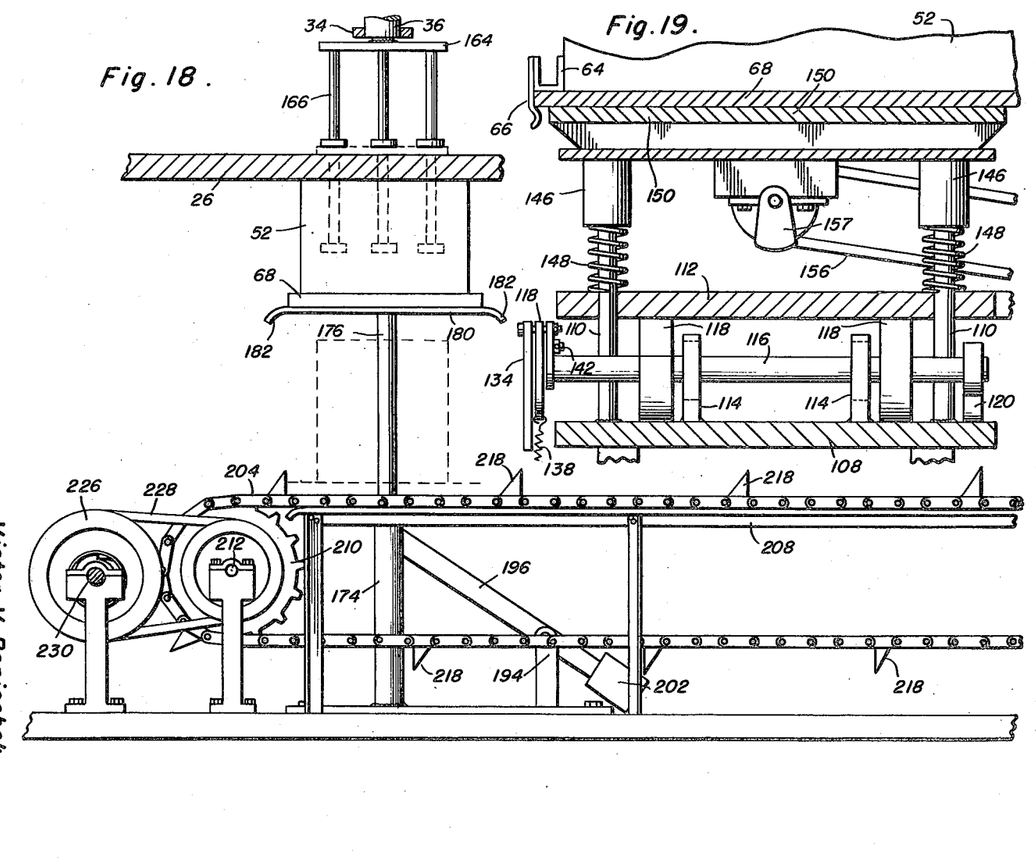
Figure 18 is a sectional view taken substantially on the line 18—18 of Figure 4.
Figure 19 is a sectional view taken substantially on the line 19—19 of Figure 8.

Mounted for vertical rocking movement in a suitable bracket 292 (Fig. 17) which projects upwardly from the bed 14 beneath the stand 16 is a lever 294 which is coupled at one end, as at 296, to the lever 96 previously referred to. The end of the lever 294 remote from the coupling 296 projects outwardly and upwardly beyond the end of the stand 16 and toward the shaft 230 into the path of the pin 290 so that as the disk 238 rotates, the lever 294 will rock about its pivotal connection with the bracket 292. It will thus be seen that the end of the lever 294 remote from the pivotal connection 296 will be elevated by its engagement with the pin 290 so that the lever 96 will be rocked about its pivot 98 to lift the link 94 and arms 82 and thus move a pallet supported by the arms 82 into engagement with the bottom of a mold box 52 at the pallet loading station. The lever 294 is provided near its pivotal connection with the lever 96 with an elongated longitudinal slot 298 in which one end of the pin 50 of the plunger 48 is received. It will thus be seen that as the lever 294 rocks about its fulcrum at the upper end of the bracket 292, the plunger 48 will be moved vertically through the column 10 to eject formed products at the ejecting station and simultaneously a pallet will be moved into contact with a mold at the pallet loading station.

*Operation*

In operation, the mold boxes 52 are placed in the respective openings 28 in the turntable 26 and a number of pallets 68 are placed in the pallet rack 76 in the position shown in Figure 2. As the drive shaft 230 is rotated, the pin 290 will engage the lever 294, causing it to rock about its fulcrum and move the plunger 42 downwardly, thus causing the block ejector 159 to move downwardly. Simultaneously with the downward movement of the plunger 42, the lever 96 is rotated about the axis of the pivot 98 to cause the end remote from its coupling 296 with the lever 294 to move upwardly, thereby causing the link 94 to swing the arms 82 upwardly as shown in Figure 2 and hence move a pallet supported by the arms against the under side of a mold box 52 which is located at the pallet loading station. The pallet thus moved against the bottom of the mold box will be held in place by the clips 66 so that when the arms 82 return to the dotted line position illustrated in Figure 2, the pallet 68 will remain in contact with the bottom end of the mold box. Also, upon the return of the arms 82 to the dotted line position illustrated in Figure 2, the cam face 92 and head 90 will engage the under side of the foremost pallet in the pallet rack 70 to lift the bottom edge thereof over the retaining hooks 78 so that the pallet will slide downwardly along the arms 82 until it engages the stops 88. Continuing its rotation, the disk 238 moves the lever 246 into the position illustrated in Figure 8, thus exerting pull on the latch arm 264 and causing the table 26 to move ninety degrees, thus positioning the mold box 52 which was located at the pallet loading station to the mold filling station under the hopper 102, and over the table 26. Simultaneously with the engagement of the latch arm 264 with the pin 32, the latch 274 is retracted to disengage a pin 32 at the opposite side of the flange 22 to permit the table to be rotated by the return stroke of the latch arm 264. As the pin 240 moves in its orbit around the axis of the shaft 230, it encounters the cam face 256 of the cam 242, thereby causing the cam 254 to rock about the axis of the shaft 252 so as to move the arm 258 and impart motion to the rock arm 124 of the table elevating shaft 116 to cause the cams 118 to elevate the platform 112 and move the table 150 into contact with the under side of the pallet 68. With the table thus elevated, the motor 152 is set into operation to cause the table to vibrate the mold so as to compact the aggregate being discharged thereinto through the hopper 102. With the vibration completed, the arm 244 again moves to retracted position, thus exerting pull on the link 142 and transmitting such pull through the arm 134 to the segmental plate 28, and owing to the pin and slot connection 260 between the arm 258 and the link 144, it will be evident that the power of the spring 138 will snap the cams 118 into table lowering position. The timing of the operation of the cam 254 and the segmental plate 128 is such that the table will be dropped as the latch arm 264 approaches the next successive pin 32 preparatory to again rotating the table. The filled mold 52 is eventually indexed to the product ejecting station which is located diametrically opposite the mold filling station, and the lowering of the plunger 48 is timed with relation to the operation of the pallet loader and the mold vibrating mechanism so that the ejector 159 will move downwardly to force the products through the bottom of a mold 52 located at the ejecting station while the pallet is being loaded and the mold box is being filled and vibrated. The heads 168 bearing on the compacted aggregate within the mold box 52 at the ejecting station will cause the pallet 68 to be disengaged from the latches 66 so that the product may be ejected through the bottom of the mold box. The pallet is supported on the transfer mechanism previously described and the cross bar 178 and arms 180 will move downwardly under the influence of the weight of the pallet and finished blocks, to be deposited on the conveyor chains 204. Downward movement of the pallet and blocks is resisted by the counterweight 202 and the air pressure within the cylinder 184, so that the pallet and products will be gently deposited upon the conveyor chains. It will thus be seen that the machine will continuously and automatically produce blocks or the like of cementitious aggregate without requiring any handling of the product from the time of the preparation of the aggregate until the finished product is deposited on the conveyor for transportation to the curing kilns. Intermittent advance of the conveyor chains 204 is obtained by the rotation of the main drive shaft 230 driving the disk 237 which, as it revolves, advances the driving face 241 of its lug 239 into contact with a driving face 235 of a lug 233, thus causing the shaft 229 to turn in its bearings. Owing to the eccentricity of the shafts 229 and 230 as the shafts rotate, the driving faces 235 and 241 slide radially over one another until they wholly separate so that rotary motion of the shaft 229 is arrested until the lug 239 makes a half revolution and engages the driving face on the diametrically opposed lug 233. In this way, the conveyor chains are advanced intermittently in a step-by-step motion and pause for a length of time sufficient to load a pallet and the products thereon.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. Apparatus for molding blocks from a plastic cementitious aggregate or the like, which includes a horizontal table mounted to rotate about a vertical axis from an aggregate supply station to a block ejecting station, spaced molds mounted in said table to move vertically with relation thereto, means at the aggregate supply station for feeding aggregate into a mold and compacting such aggregate in the mold, means operating from above the table at the block ejecting station to eject molded blocks downwardly through a mold positioned at the ejecting station, a product conveyor beneath the table at the ejecting station, and transfer means including a vertically movable table adapted to receive a block as it is ejected from the mold and lower it onto the conveyor.

2. Apparatus for molding blocks or the like from a plastic aggregate which includes, a turntable mounted to rotate about a vertical axis, radially spaced molds mounted in said table to move vertically with relation thereto, indexing means to rotate the table and move the molds successively from an aggregate filling station to a block ejecting station, a vertically movable jolting means beneath the table at the aggregate filling station adapted to jolt the mold vertically so as to compact the aggregate as it is being deposited in the mold, means to alternately raise said jolting means to an operative position and lower the same to an inoperative position, means operable above the table at the block ejecting station to eject molded blocks downwardly through a mold positioned at the ejecting station, a product conveyor beneath the table at the ejecting station and transfer means including a vertically movable table adapted to receive a block as it is ejected from the mold and lower it onto the conveyor.

3. Apparatus for molding blocks from a plastic cementitious aggregate or the like, which includes, a turntable mounted to rotate about a vertical axis, radially spaced molds mounted in said turntable to move vertically with relation thereto, means to rotate the table with a step-by-step motion in succession from an aggregate filling and compacting station to a block ejecting station, a vertically movable jolting means beneath the table at the aggregate filling station to jolt a mold vertically and compact the aggregate as it is being deposited therein, means to alternately raise said jolting means to an operative position and lower the same to an inoperative position, means operable above the turntable at the ejecting station to eject molded blocks downwardly through a mold positioned at the ejecting station, a product conveyor beneath the table at the ejecting station, and transfer means including a vertically movable table adapted to receive a block as it is ejected from the mold and lower it onto the conveyor.

4. Apparatus for molding blocks from a plastic cementitious aggregate or the like which includes, a tubular column, a turntable mounted on the tubular column to rotate about a vertical axis, circumferentially spaced molds mounted in the turntable to move vertically, a hopper mounted above the table successively to direct plastic aggregate into the molds as the table is rotated about the vertical axis, means beneath the hopper to jolt a mold positioned beneath the hopper and compact the plastic aggregate entering the mold from the hopper, a block ejector operable above the table remote from the hopper and means operable through the tubular column to move the block ejector downwardly to eject a molded block downwardly through a mold positioned beneath the ejector.

5. Apparatus for molding blocks from a plastic cementitious aggregate or the like which includes, a tubular column, a turntable mounted on the tubular column to rotate about a vertical axis, circumferentially spaced molds mounted in the turntable to move vertically, a hopper mounted above the table successively to direct plastic aggregate into the molds as the table is rotated about the vertical axis, means beneath the hopper to jolt a mold positioned beneath the hopper and compact the plastic aggregate entering the mold from the hopper, a block ejector operable above the table remote from the hopper, means operable through the tubular column to move the block ejector downwardly to eject a molded block downwardly through a mold positioned beneath the ejector, a product conveyor beneath the ejector and transfer means to receive a block as it is ejected from the mold and deposit it on the conveyor.

6. Apparatus for molding blocks from a plastic cementitious aggregate or the like, which includes a table, molds mounted in said table to move horizontally from an aggregate supply station to a block ejecting station, said molds being mounted in said table to move vertically with relation thereto, an aggregate directing hopper engaging the top of the table at the aggregate supply station for feeding aggregate into a mold positioned therebeneath, means beneath the hopper to jolt the mold and compact the aggregate therein, means operating from above the table at the block ejecting station to eject molded blocks downwardly through a mold positioned at the ejecting station, a product conveyor beneath the table at the mold ejecting station, transfer means including a vertically movable table adapted to receive a block as it is ejected from a mold and lower it onto the conveyor, and means to index the table in a step-by-step motion to advance the molds in succession to the aggregate supply station and to the block ejecting station.

7. Apparatus for molding blocks from a plastic cementitious aggregate or the like which includes, a tubular column, a turntable mounted on the tubular column to rotate about a vertical axis, circumferentially spaced molds mounted in the turntable to move vertically, a hopper mounted above the table successively to direct plastic aggregate into the molds as the table is rotated about the vertical axis, means beneath the hopper to jolt a mold positioned beneath the hopper and compact the plastic aggregate as it enters the mold from the hopper, a block ejector operable above the table remote from the hopper, means operable through the tubular column to move the block ejector downwardly to eject a molded block downwardly through a mold positioned beneath the ejector, and means to index the table in a step-by-step motion to advance the molds in succession to the aggregate supply station and the block ejecting station.

8. Apparatus for molding blocks from a plastic cementitious aggregate or the like which includes, a tubular column, a turntable mounted on the tubular column to rotate about a vertical axis, circumferentially spaced molds mounted in the turntable to move vertically, a hopper mounted above the table successively to direct plastic aggregate into the molds as the table is rotated about the vertical axis, vertically movable jolting means beneath the hopper to jolt a mold positioned beneath the hopper and compact the plastic aggregate entering the mold from the hopper, means to alternately raise said jolting means to an operative position and lower the same to an inoperative position, a block ejector operable above the table remote from the hopper, means operable through the tubular column to move the block ejector downwardly to eject a molded block downwardly through a mold positioned beneath the ejector, means to index the table in step-by-step motion to advance the molds in succession to the aggregate supply station and the block ejecting station, and means to actuate the mold jolting means and the block ejector in timed relation to the table indexing means.

9. A machine of the class described comprising a turntable mounted to rotate about a vertical axis, radially spaced molds mounted in said turntable to freely move vertically relative thereto, means to intermittently rotate said turntable to successively move the molds to a pallet supply station, an aggregate supply station, and a block ejecting station, pallet applying means to raise a pallet and removably apply the same to the bottom of each mold when it has been moved to said pallet supply station, means to feed pallets one at a time to said pallet applying means, means to feed aggregate into each mold when it has been moved to said aggregate supply station, jolting means to vertically jolt each mold as the aggregate is fed thereto, means to alternately raise said jolting means to an operative position and then lower the same to an inoperative position between successive rotating movements of the turntable, means to eject a molded block downwardly from each mold when it has been moved to the block ejecting station, a block conveyor beneath the turntable, and transfer means including a normally raised vertically yieldable table to receive the block ejected from each mold and lower it onto said conveyor.

VICTOR V. BENISCHEK.

REFERENCES CITED

The following references are of record in the file of this patent:

UNITED STATES PATENTS

| Number | Name | Date |
|---|---|---|
| 435,171 | Davis | Aug. 26, 1890 |
| 1,599,151 | Vought | Sept. 7, 1926 |
| 2,231,064 | Fearn | Feb. 11, 1941 |
| 2,317,574 | Williams | Apr. 27, 1943 |